E. KOERTING, Jr. & O. THRAENHART.
STUFFING BOX.
APPLICATION FILED FEB. 6, 1912.

1,056,282.  Patented Mar. 18, 1913.

Witnesses:
L. Hutchinson
C. D. Brown

Inventors:
Ernst Koerting jr
by Oskar Thraenhart
Foster Freeman Watson & Coit
Attorneys

UNITED STATES PATENT OFFICE.

ERNST KOERTING, JR., AND OSKAR THRAENHART, OF LINDEN, NEAR HANOVER, GERMANY, ASSIGNORS TO GEBR. KOERTING AKTIENGESELLSCHAFT, OF KÖRTINGSDORF, NEAR HANOVER, GERMANY.

STUFFING-BOX.

1,056,282.  Specification of Letters Patent.  Patented Mar. 18, 1913.

Application filed February 6, 1912. Serial No. 675,880.

*To all whom it may concern:*

Be it known that we, ERNST KOERTING, Jr., a subject of the King of Prussia, and resident of 71 Badenstedterstrasse, Linden, near Hanover, Germany, and OSKAR THRAENHART, a subject of the King of Prussia, and resident of 8 Schwalenbergerstrasse, Linden, near Hanover, Germany, have jointly invented a new and useful Improved Stuffing-Box, of which the following is a specification.

This invention relates to an improvement in stuffing boxes for the piston rods of internal combustion engines and has for its object to prevent the destruction of the packing rings by tongues of flame entering between the piston rod and the bush of the stuffing box during the explosion or combustion owing to the pressure in the engine cylinder.

The invention also has for its object to prevent burnt fuel, dust and the like being forced into the stuffing box by the pressure existing in the cylinder which easily occasions leakage of the stuffing box.

According to the present invention a compressed incombustible cooling gas such as air, is supplied to a space between the packing material and the piston rod from which it may flow into the engine cylinder. By this means the packing material of the stuffing box is kept cool and the products of combustion prevented from entering the stuffing box.

In order that the invention may be more clearly understood, reference is made to the accompanying drawings which show by way of example two methods of carrying out the invention.

Figure 1:
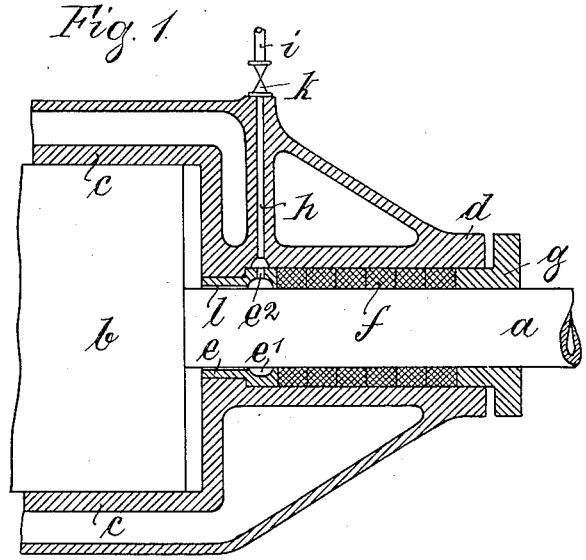
Figure 2:
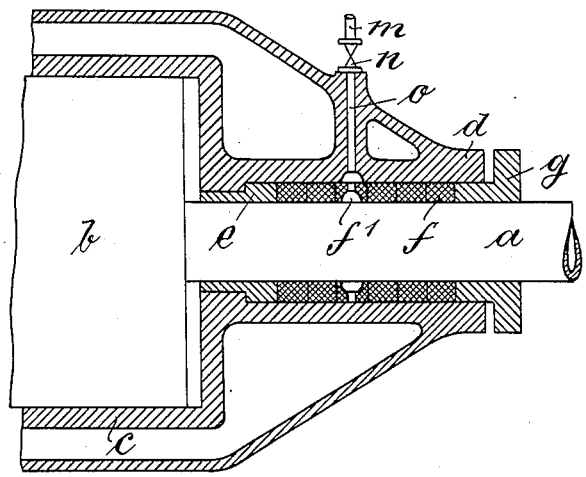

Figure 1 is a sectional view through one form of the stuffing box, and Fig. 2 a similar view of a slightly modified form of same.

On the drawings $a$ indicates the piston rod of a piston $b$ working within the cylinder $c$ of an internal combustion engine, the piston rod $a$ working through a stuffing box casing $d$ which is provided with a bush $e$, packing rings $f$ and a gland $g$ in the usual manner. In Fig. 1 of the drawings the bush $e$ is provided with an interior annular groove $e'$ connected by means of an aperture $e^2$ to a bore $h$ to which a compressed incombustible cooling gas such as air is supplied from a supply pipe $i$ through a regulating valve $k$, the bush $e$ being of somewhat larger diameter than the piston rod $a$ so as to provide an annular space $l$ through which the compressed air entering the groove $e'$ may escape into the cylinder $c$. In order to obtain efficient cooling of the stuffing box it is desirable that the compressed air be supplied at a greater pressure than the maximum pressure existing in the cylinder and at a considerably lower temperature although it will of course be understood that the compressed air may be supplied at a lower pressure and slightly heated. The regulating valve $d$ may be so arranged as to cut off the supply of compressed air when little or no pressure exists in the interior of the cylinder $c$ and the supply of compressed air thereby economized.

In the modification shown in Fig. 2 the packing rings $f$ are provided with an annular groove $f'$ communicating with the bore $o$, to which a compressed incombustible cooling gas is supplied from a pipe $m$ through a regulating valve $n$. By this means the supply of compressed air may be economized while at the same time obtaining an efficient cooling of the packing material.

In the appended claims it is to be understood that the term "packing material" includes both the packing rings and the bush or head of the stuffing box.

We claim:—

1. A stuffing box for the piston rods of internal combustion engines, comprising packing material around the piston rod and means for supplying a compressed incombustible cooling gas to the space between said packing material and piston rod to prevent the entry of flames and foreign matter into said space.

2. A stuffing box for the piston rods of internal combustion engines, comprising packing material around the piston rod, an internal annular groove in the inner peripheral surface of said packing material, and means for supplying a compressed incombustible cooling gas to said groove to prevent the entry of flames and foreign matter into the space between said packing material and piston rod.

3. A stuffing box for the piston rods of internal combustion engines, comprising packing material around the piston rod, means for supplying a compressed incombustible cooling gas to the space between said packing material and piston rod to prevent the entry of flames and foreign matter into said space, and valve means for regulating the supply of said compressed gas according to the pressure existing in the engine cylinder.

4. A stuffing box for the piston rods of internal combustion engines, comprising a bush and packing rings around the piston rod, a groove in the inner peripheral surface of said bush and means for supplying a compressed incombustible cooling gas to said groove.

5. A stuffing box for the piston rods of internal combustion engines, comprising a bush and packing rings around the piston rod, said bush being of somewhat larger diameter than the piston rod so as to provide an annular space between said bush and piston rod open to the engine cylinder, a groove in the inner peripheral surface of said bush and means for supplying compressed air to said groove for cooling said bush and for scavenging foreign matter out of said annular space.

In witness whereof we have hereunto set our hands in the presence of two witnesses.

ERNST KOERTING, Jun.
OSKAR THRAENHART.

Witnesses:
JOHANNES EBERDING,
FRANZ TIGGES.